United States Patent [19]

Graham

[11] Patent Number: 4,666,173
[45] Date of Patent: May 19, 1987

[54] FOOT PEDAL DRIVE FOR BICYCLES

[76] Inventor: Garnard E. Graham, 12003 NE. 199th St., Battleground, Wash. 98604

[21] Appl. No.: 808,212

[22] Filed: Dec. 10, 1985

Related U.S. Application Data

[63] Continuation-in-part of Ser. No. 689,789, Jan. 8, 1985, abandoned.

[51] Int. Cl.⁴ .............................................. B62M 1/04
[52] U.S. Cl. ..................................... 280/255; 74/25; 74/47; 280/257; 280/258
[58] Field of Search ............. 280/244, 246, 247, 253, 280/255, 256, 257, 258, 270; 74/25, 37, 47

[56] References Cited

U.S. PATENT DOCUMENTS

| | | | |
|---|---|---|---|
| 595,501 | 12/1897 | Stoops | 280/244 |
| 608,674 | 8/1898 | Harshner | 280/257 |
| 1,505,271 | 8/1924 | McNeil | 280/253 |
| 1,605,750 | 11/1926 | McCarty | 280/244 |
| 3,877,724 | 4/1975 | Chase | 280/253 |
| 4,300,784 | 11/1981 | Efros | 280/255 |
| 4,561,318 | 12/1985 | Schirrmacher | 280/253 |

FOREIGN PATENT DOCUMENTS

| | | | |
|---|---|---|---|
| 378221 | 9/1907 | France | 280/257 |
| 837231 | 2/1939 | France | 280/257 |
| 924398 | 8/1947 | France | 280/257 |
| 378280 | 1/1940 | Italy | 280/253 |
| 487 | 1/1915 | Netherlands | 280/246 |
| 8299 | of 1897 | United Kingdom | 280/251 |
| 293005 | 6/1928 | United Kingdom | 280/253 |

Primary Examiner—John J. Love
Assistant Examiner—Everett G. Diederiks, Jr.
Attorney, Agent, or Firm—Robert L. Harrington

[57] ABSTRACT

A bicycle having pedal bars pivoted on the frame near the rear wheel, with a pedal sprocket positioned above the rear wheel. A connection member couples the rear end of each of the pedal bars to the pedal sprocket and further includes conversion mechanism whereby up and down movement of the push bars induces rotative movement of the pedal sprocket. Foot pedals are mounted on the front end of the pedal bars. Downward pressure by a rider on the foot pedals (alternately applied) forces upper movement of the connection members and corresponding rotation of the pedal sprocket for driving the bicycle.

5 Claims, 8 Drawing Figures

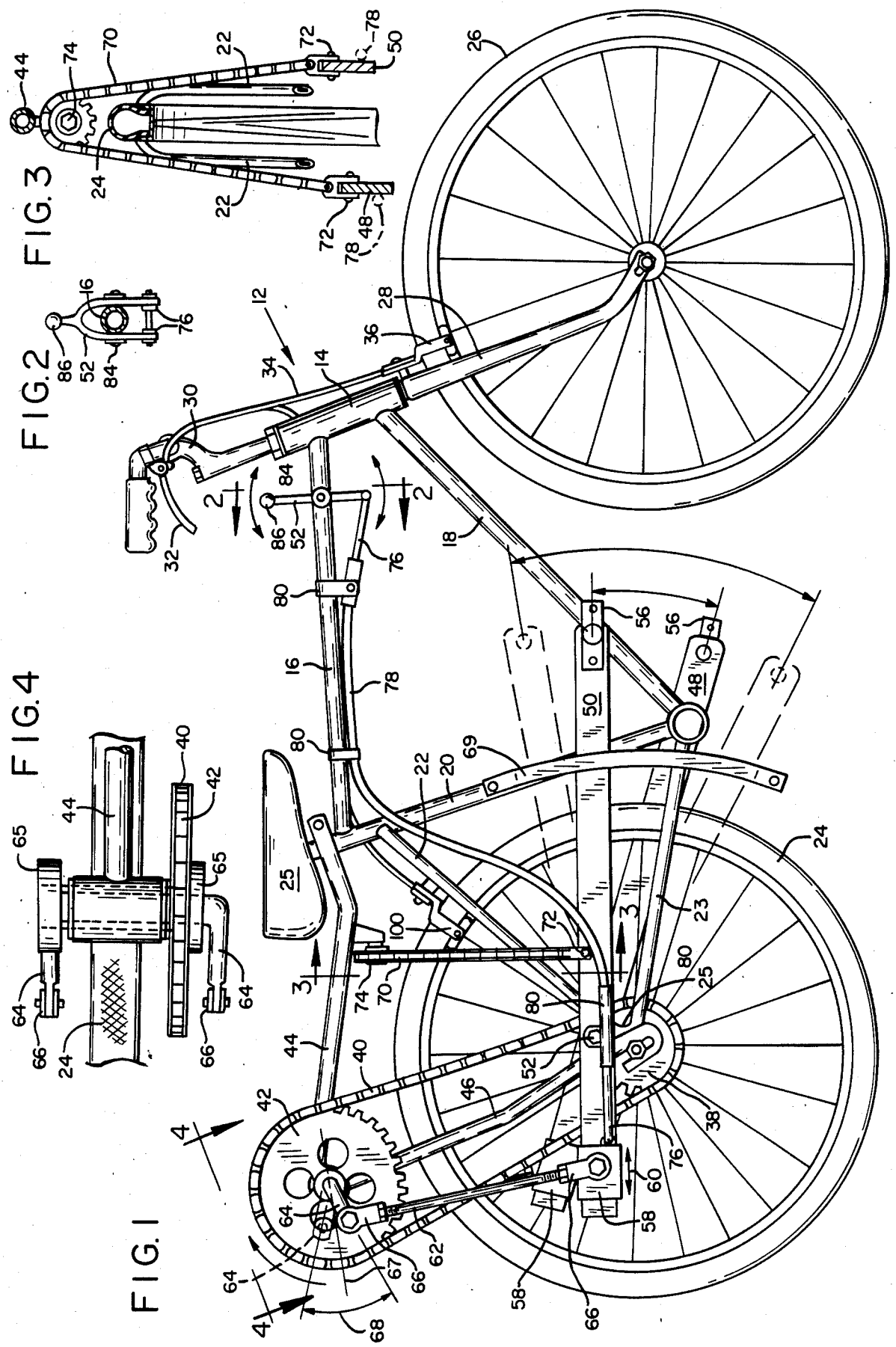

FOOT PEDAL DRIVE FOR BICYCLES

This application is a continuation-in-part of application Ser. No. 689,789, filed 1/8/85, now abandoned.

FIELD OF INVENTION

This invention relates to bicycles and more particularly to bicycles having linear pedal movement.

BACKGROUND OF INVENTION

The conventional bicycle utilizes a wheel sprocket connected to the hub of the rear wheels, a pedal sprocket mounted between the front and rear wheels, and a drive chain connecting the two sprockets. Forced rotation of the pedal sprocket produces rotation of the wheel sprocket and thereby rotation of the rear wheel. A foot pedal projects laterally from each side of the pedal sprocket but radially spaced from the sprocket axis and 180° from each other. The bicycle rider generates circular movement of the pedals around the pedal sprocket axis with his feet to produce rotative motion of the pedal sprocket and propulsion of the bicycle.

The degree of difficulty in pedaling the bicycle is dependent on many factors. For example, accellerating a bicycle from a stopped position or climbing a hill is far more difficult then simply maintaining a set speed on a level street. Where difficulty is a factor, it can be minimized by "gearing down", a term used herein to describe a relationship between the pedal sprocket and wheel sprocket whereby several turns of the pedal sprocket is required for a single turn of the wheel sprocket. The leverage that is produced in "gearing down" enables the force of the rider pushing against the pedals to have increased effectiveness. However, as the bicycle gains speed the rider will find it difficult to rotate his feet fast enough to keep up. Thus, where speed is an important factor, the rider will want to "gear up" i.e. a relationship whereby a single turn of the pedal sprocket will generate one or more turns of the wheel sprocket.

Whereas gear shifting mechanism has been developed to where bicycles having many gear positions are available, they all require a peddling power produced by a circular motion of the rider's feet. To produce the desired circular force, the rider goes through a series of movements wherein the pedal, from near its upper most position, is pushed forward, then forward and down, and then down and rearward, until the opposite pedal nears its upper most position and the same action is repeated with the opposite foot. Thigh, leg, back and arm muscles all come into play and although the rider's weight is a definite factor in helping to produce the circular force, it is only a factor and bicycling for any period of time is a strenuous exercise.

It is an object of the present invention to simplify the rider's movements in developing the force to propelthe bicycle. This is primarily accomplished with mechanism that also generates advantages that reduces the required force without the attendent reduction in speed capabilities.

BRIEF DESCRIPTION OF INVENTION

In the preferred embodiment of the present invention, the pedal sprocket is removed from its position between the front and rear wheels and is mounted over the back wheel (but it remains connected to the drive chain and through it to the wheel sprocket). A pair of rigid pedal bars are pivotally mounted to the bicycle frame at each side of the rear wheel near the rear wheel axis. A short length of the bar extends rearward of the pedal bar pivotal connection and a substantially greater length of the bar, e.g. three to five times longer, extends forward of the pivotal connection to a position between the front and rear wheels (e.g. the approximate position where the pedal sprocket was previously mounted). Foot pedals are mounted on the forward end of each pedal bar. A rigid rod couples the rear end of the pedal bar to the pedal sprocket. The rigid bar connection with the pedal sprocket is mechanically designed to convert the up and down movement of the pedals mounted on the front end of the bars into rotatary motion of the pedal sprocket to drive the wheel sprocket and thereby propel the bicycle.

The substantially greater length of the pedal bar forward of the pivotal connection provides substantial leverage advantage to the rider in forcing downward movement of the pedal and consequent rotation of the pedal sprocket. Furthermore, downward movement of the foot pedal is substantially a linear movement and simply requires the shifting of the rider's weight from one foot to the other.

DETAILED DESCRIPTION AND DRAWINGS

Other advantages as well as a more complete understanding of the invention will be derived by reference to the following detailed description and drawings wherein:

FIG. 1 illustrates a bicycle incorporating the preferred embodiment of the invention;

FIG. 2 is an enlarged view of one component of the drive system of the bicycle as taken on view lines 2—2 of FIG. 1;

FIG. 3 is an enlarged view of a second component of the drive system as taken on view lines 3—3 of FIG. 1;

FIG. 4 is an enlarged view of a third component of the drive system as taken on view lines 4—4 of FIG. 1.

Figure 5:
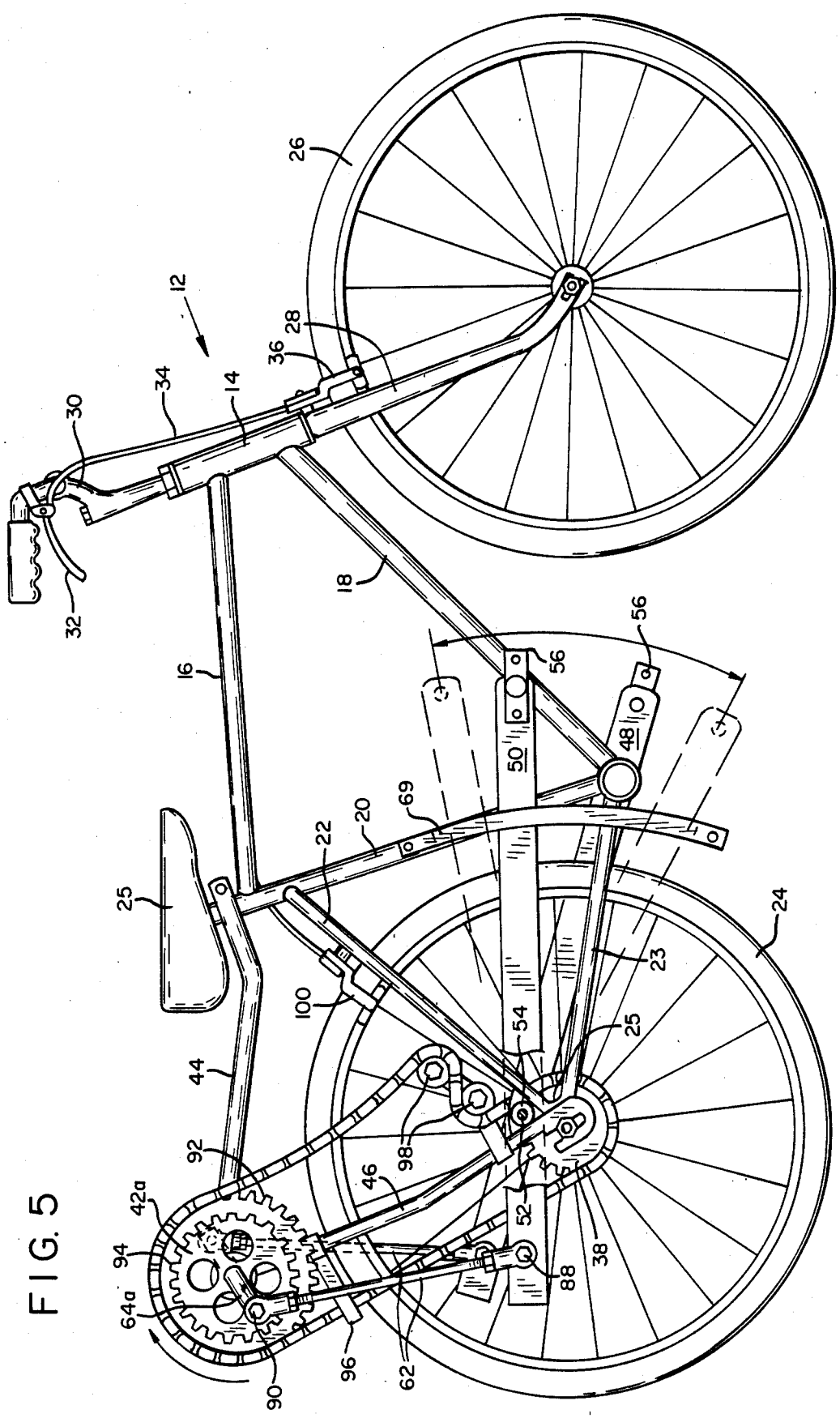
FIG. 5 is an alternate embodiment of the invention.

Referring to FIG. 1 of the drawings, the illustrated bicycle includes many conventional components. A frame 12 includes a front spindle holder 14, upper and lower lateral bars 16 and 18 rigidly connected to spindle holder 14, a rear vertical bar 20 rigidly connected to bars 16 and 18, and upper and lower rear wheel holding bars 22 and 23 connected at one end to bar 20 and rotatably supporting a rear wheel 24 at the other end. (In actuality, bars 22 and 23 are interconnected by connecting web 25.) A front wheel 26 is carried by a fork bar 28 having a spindle portion extended through the spindle holder 14 and forming at its upper end handle bars 30. A brake lever 32 is connected through a cable 34 to a brake mechanism 36 for braking the front wheel.

All of the components briefly described above are conventional for bicycles. Various supplemental and/or subassemblies are also commonly utilized for bicycle designs. However, a simple appreciation of the basic structure as represented by these components is all that is required for an understanding of the operation of a bicycle (except for the drive mechanism to which this invention is directed and which will now be described).

It will be understood that the rear wheel 24 is rotatably mounted on a hub that is fastened to the bars 22 and 23 in the conventional manner so as to allow the wheel to freely rotate around the hub. A wheel sprocket 38 engages the wheel 24 but includes a slip clutch mechanism so that forward rotation of the sprocket 38 forces at least equal rotation of the wheel 24 while allowing independent rotation of the wheel that is greater than that of the sprocket. (Again, a standard component of the conventional bicycle.) The wheel sprocket 38 is drivingly engaged through drive chain 40 with a pedal sprocket 42 that is rotatably supported above and slightly rearward of wheel 24. (The location of the pedal sprocket is primarily for convenience.) The support for the pedal sprocket is provided by a lateral brace 44 rearwardly extended from bar 20 and brace 46 extended upwardly from its rear wheel hub connection.

Left and right elongated pedal bars 48 and 50 are pivotally mounted through pivot pin 52 to the brace 46. (A lug 54 is provided on the brace 46 at the point of connection and has a pin opening through which pin 52 protrudes. The lug 54 can be seen in FIG. 5 wherein a portion of the right pedal bar 50 is removed.) The forward end of pedal bars 48 and 50 are provided with foot pedals 56. The rearward end of each of the pedal bars 48 and 50 are provided with brackets 58 adapted to slide back and forth on the bar end as indicated by arrow 60. Connecting rods 62 (sometimes referred to as push rods) are pivotally connected at one end to the brackets 58 and at the other end to arms 64. Arms 64 are attached through sprague clutches 65 (See FIG. 4) to the shaft of the pedal sprocket 42. (Note that the arms 64 and sprague clutches 65 independently engage the pedal sprocket.) Rods 62 are provided with coupling lugs 66 at each end to enable fine adjustment of the rod length as may be required. It will be understood that the sprague sprockets, well known in various mechanical drive arts, allows the connecting rods 62 and arms 64 to engage and force partial clockwise turning of the pedal sprocket 42 during an "up" stroke of rod 62 and free return of the rod arm in the "down" stroke as the rod and arm reciprocate through an angular motion as indicated by arrow 68.

It will also be understood that the left pedal components, including bar 48, rod 62, arm 64 and the sprague clutch 65 therefor are designed to function opposite to the right pedal bar 50 and its component so that the left pedal arm and rod are in the upper position when the right pedal arm and rod are in the lower position and vice versa. This relative upper and lower positioning of the left and right pedal bar components is accomplished by interconnecting the pedal bars 48 and 50 which will now be explained.

Note that the portion of pedal bar 50 forward of the pivot 52 is in the lower position when the rod 62 and arm 64 are in the upper position. It follows that a downward force on foot pedal 56 raises rod 62 and arm 64 to force rotation of the sprocket. (The sprague clutch being oriented to drive the pedal sprocket only in a clockwise direction as viewed in FIG. 1.) Whereas the rider achieves downward movement of pedal 56 by applying his weight to that foot, releasing his weight does not allow for return. That is accomplished by interconnecting the two rods 48 and 50 through connecting chain 70 having its ends 72 connected to the left and right pedal bars 48 and 50 and which passes over an idler sprocket 74 (mounted to brace 44). Thus, as the right pedal 56 is forced down, it raises the left pedal bar and vice versa.

In operation, it will be understood that the rider initiates forward propulsion by applying his weight to whichever of the pedals 56 is in the raised position. (In FIG. 1, this is the right pedal.) As the pedal 56 is forced downward, the rear end of rod 50 is forced up (vertical motion of rod 50 is contained by a channel strap 69). Accordingly, rod 62 and arm 64 on the right side are forced upwardly through angular motion 68 to force clockwise turning of sprocket 42 and through chain 40, clockwise turning of sprocket 38 and corresponding clockwise rotation of wheel 24 to drive the bicycle forward. This same downward motion of the forward portion of right pedal rod 50, through chain 70, raises the left pedal rod 48 to return rod 62 and arm 64 on the left side to its lower position (which return motion is independent of sprocket 42 as permitted by the sprague clutch 65). The weight of the rider is then shifted to the left foot and the process is repeated.

It will be appreciated that the degree of angular movement 68 is related to the vertical movement of bracket 58 to which rod 62 is attached. It will further be appreciated that for a given vertical movement of pedal 56, at a fixed distance from point 52, the vertical movement of bracket 58 can be effected by sliding the bracket forward and rearward on pedal rod 50. Thus, as bracket 58 is moved rearward, angular motion 68 is increased and of course forward positioning of bracket 58 shortens this angular motion 68.

Referring to FIG. 2 as well as FIG. 1, shifting of brackets 58 on pedal rods 48 and 50 is accomplished by a cable 76 that passes through a stiffening tube 78 (connected to the bicycle frame at various points by brackets 80) with one end attached to bracket 58 and the other to lever 82. Lever 82 is pivotally connected to bar 16 at pivot 84 and by maneuvering handle 86, shifting of brackets 58 is achieved.

It will be appreciated that the angular movement 68 of arm 64, which is centered on center line 67 (perpendicular to rod 62) is preferably maintained within an angular range no greater than about 45° to maximize the substantially linear force applied by rod 62. This limitation of angular movement can be achieved by any appropriate means, e.g. by limiting the upper and lower positions of rods 58 and 60 within the channel strips 69. Also it will be appreciated that where power is of lesser importance, bracket 58 can be adjusted to achieve upwards of 100° and greater angular movement of arms 64.

FIG. 5 illustrates a variation of the drive mechanism. In FIG. 5, arm 64a is designed to fully rotate with pedal sprocket 42a. To accomplish this, a full stroke of rod end 88 (connected directly to rod 50) must match the stroke of its opposite end connected at point 90 to arm 64a. (The distance of point 90 from the center of rotation of sprocket 42a is half the distance of the required full stroke of rod end 88.)

In operation, the downward movement of pedal 56 forces 180° movement of arm 64a at which point the opposite pedal takes over. Note that in this embodiment the arms 64a on each side of the pedal sprocket are angularly offset 180° from each other. Increasing and decreasing the rotational speed of the wheel 24 relative to the downward stroke of pedal 56 is achieved by changing the relationship of the pedal sprocket 42a to wheel sprocket 38. This is accomplished by the shifting of the drive chain from one set of pedal sprocket teeth 92 to a second set of sprocket teeth 94 in the conventional manner represented by the shifting lever 96 and tension rollers 98.

It may be desirable to provide means to maintain the clockwise rotation of arms 64a, e.g. a spring from arm 64a to the frame that is positioned to urge the arm past the neutral point in a clockwise direction (as seen in FIG. 5.). A variety of means are available and a specific mechanism is not shown so as to maintain clarity of the drawings. A simple brake mechanism 100, also well known to the art, is preferably mounted to the rear wheel in both of the embodiments of FIGS. 1 and 5.

Figure 8:
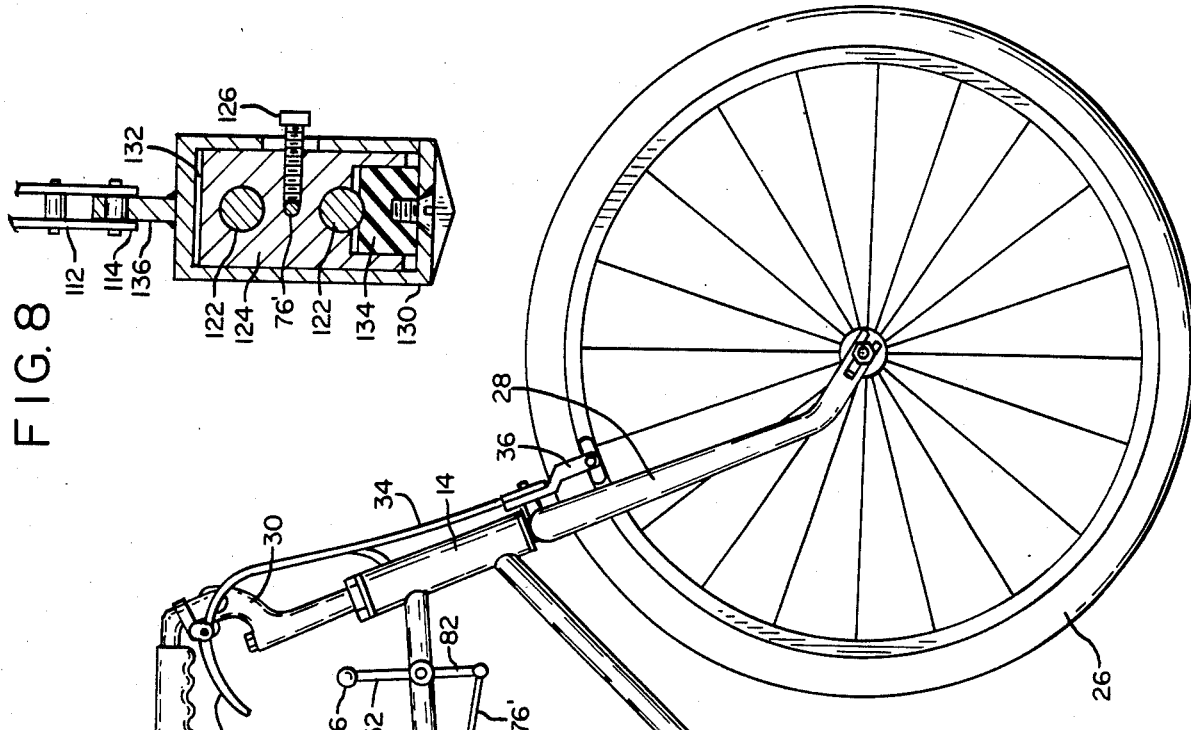
FIG. 8 is a sectional view as taken on section lines 8—8 of FIG. 7.
Figure 7:
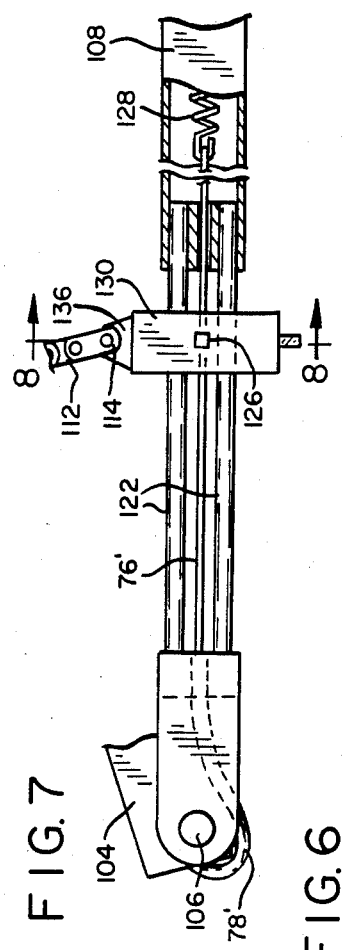
FIG. 7 is a partial view of the pedal bar of the embodiment illustrated in FIG. 6.
Figure 6:
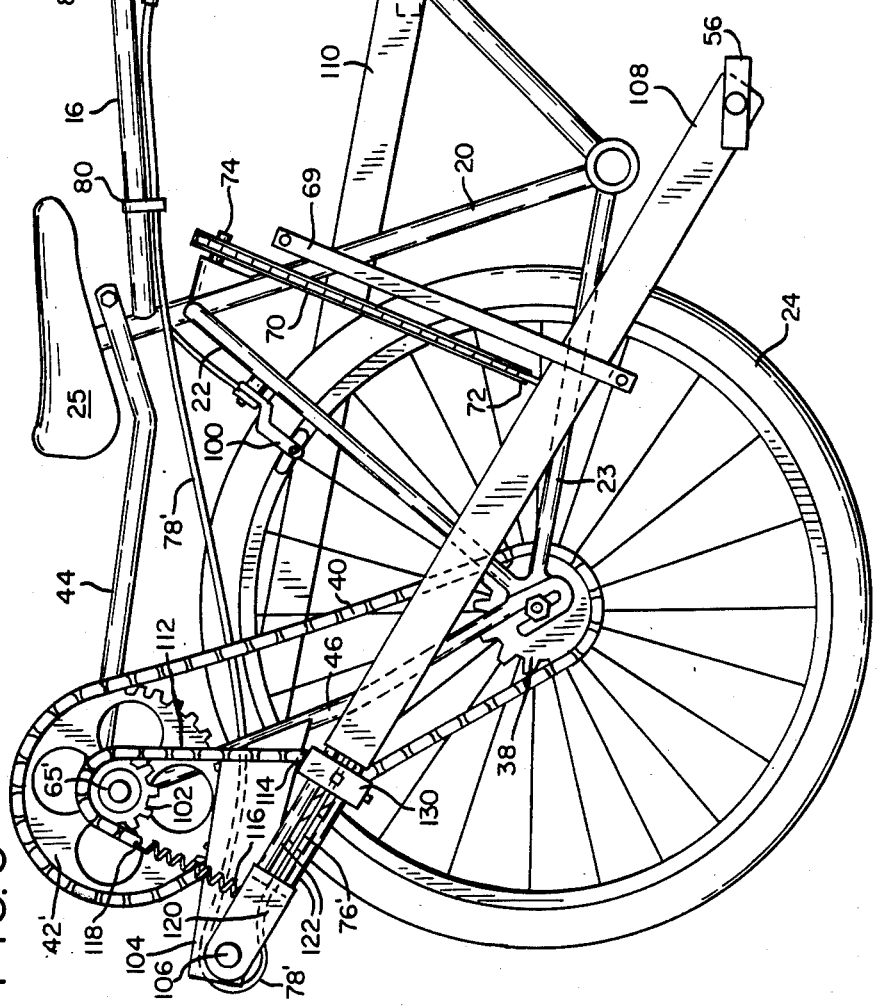
FIG. 6 is a further embodiment of the invention.

FIGS. 6 through 8 illustrate a further embodiment of the invention. Many of the parts are common with the embodiment of FIG. 1 and similar reference numbers are used to indicate these common parts. Thus the basic frame is the same with only slight modification which will be hereafter noted. The pedal sprocket 42′ is similarly mounted and is similarly interconnected to the wheel sprocket 38. The difference in the pedal sprocket 42′ as compared to the pedal sprocket 42 of FIG. 1 involves the manner by which the pedal sprocket 42′ is driven.

Sprague sprockets are again employed (indicated by reference no. 65′ in FIG. 6) but the arms 64 of FIG. 1 are replaced by sprocket teeth 102. With the exception of the change over just indicated (i.e. arms 64 being replaced by teeth 102), the modifications to the FIGS. 6 through 8 embodiment reside in the design for the pedal bars, the mounting thereof to the bicycle, and the power transmission linkage as between the pedal bars and the pedal sprocket.

The frame of the bicycle is provided with a rearwardly extended flange portion 104 e.g. extending from brace 46. A pivotal connection 106 pivotally connects pedal bars 108 and 110 (adjacent the rearmost end of the bars) to the flange portion 104. Pedals 56 are provided on the forwardmost ends of the pedal bars, and the two bars 108 and 110 are interconnected by a connecting chain 70 and idler sprocket 74 in the same manner as explained for FIG. 1.

Hereafter, a description of the pedal rods will be directed to pedal rod 108 only, but the reader is to understand that similar components are provided for pedal rod 110. A transmission chain 112 is anchored at one end 114 to the pedal bar 108 at a position forward of pivot 106 but substantially closer to pivot 106 than to pedal 56. (This point of anchoring can be adjusted, to a limited extent, along pedal bar 108 which will be explained in a subsequent paragraph.) The transmission chain 112 extends from the end 114 and around the sprague sprocket 65′ where it engages sprocket teeth 102. A spring 116 is connected to end 118 of chain 112 and is anchored to flange portion 104.

It will be appreciated that the sprague sprocket 65′ (as explained for the embodiment of FIG. 1) functions to engage and rotatably drive the pedal sprocket 42′ in a clockwise direction (as viewed in fig.6) as pedal bar 108 is pushed downward. In reverse fashion, as pedal bar 110 is pushed down, connecting chain 70 raises pedal bar 108, spring 116 draws the chain 112 back over sprocket 65′ to rotate the sprocket 65′ in a counter clockwise direction. As is the conventional design for such sprague sprockets, a clutch mechanism allows slippage of the sprocket 65′ relative to pedal sprocket 42′ (which is then being controlled by pedal bar 110).

Reference is now made to the adjustment feature of the pedal bar mechanism. It will be appreciated that a mechanical advantage is derived by reason of the distance of pedal 56 from pivot 106 relative to the distance of chain end 114 from pivot 106. However, a similar relationship exists for the vertical distance that pedal 56 moves compared to the vertical distance that chain end 114 is moved, which movement translates into angular movement for sprockets 65′ and 42′. It follows that shifting of end 114 along the bar length changes these relationships i.e. a forward shifting of end 114 will increase the angular movement of the sprocket 65′ and 42′ for the same pedal movement, but such pedal movement requires more downward force. This forward positioning of end 114 is desirable e.g. with the bicycle on a level stretch of road. A rearward positioning of chain end 114 shortens the stroke and angular movement of sprockets 65′ and 42′ but increases the mechanical advantage and is desirable in start up or hill climbing.

The shifting of chain end 114 is illustrated in FIGS. 6, 7 and 8. The pedal bar 108 is provided with a section that is comprised of parallel rods 122. A metal block 124 is slidable along the rods 122 and can thus be adjusted, back to front on the pedal bar as permitted by the length of the rods 122. A shift cable 76′ and a stiffening tube 78′, extends from the shift lever 82 to the pedal bar 108 at a point adjacent pivot 106, and then down the bar 108 to the point where the rods 122 begin. The tube 78′ terminates at this point and the cable 76′ extends between the rods 122 and through the block 124 to which it is clamped by set screw 126. The cable 76′ continues through the length of rods 122 and is connected to one end of a spring 128 that is connected at it's other end to the rod 108.

Referring now to FIG. 8, surrounding the block 124 is a rigid box-like bracket 130. The block 124 and bracket 130 are designed to permit slight vertical movement of block 124 in the bracket as denoted by space 132 in FIG. 8. Located inside the bracket and between the bracket and the lower rod 122 is a brake shoe 134. Located at the top of the bracket 130 is a connecting lug 136 to which chain end 114 is connected. As the pedal bar 108 is forced downwardly, rods 122 (being part of the bar 108) generate a downwardly directed force to block 124. Bracket 130 resists this downward movement and brake shoe 134 is compressed between the lower rod 122 and the bottom of bracket 130. This compression creates resistance against undesired slipping of the block 124 along the rods 122. When shifting of the block is desired, the rider lets up on the downward force applied to both pedals, the shift lever 82 is maneuvered to retract or extend the cable 76′ and thereby the block 124 along the rods 122.

It will of course be appreciated that, whereas a single cable and cable tube extends from lever 82 to pivot 106, the cable splits at this point into a left and right cable to accommodate the two pedal rods 108 and 110.

It is believed that the embodiments herein described offer the primary advantage of enabling a linear movement of the pedals 56 to drive the bicycle. The weight of the rider thus becomes optimally applied. Also, it enables the additional application of leverage by providing a greater distance from the point 52 to the pedals 56 as compared to connection 88 (or bracket 58). Even further, consider a third alternative wherein the ratchet motion and adjustment of brackets 58, (enabled by the sprague sprockets in the embodiment of FIG. 1) is combined with a conventional shifting mechanism as illustrated in the embodiment of FIG. 5. Such a third embodiment further expands the bicycle designer's ability to provide adjustment of pedal movement versus wheel speed.

Whereas numerous improvements and variations of the embodiments described will become apparent to those skilled in the art, the scope of the invention is determined by the definition set forth in the claims appended hereto.

I claim:

1. A bicycle including a rigid frame rotatably supporting front and rear wheels wherein a rear wheel sprocket is adapted to be drivingly engaged for rotatably driving the rear wheel, and the improvement thereto which comprises; a pedal sprocket mounted to the frame, first coupling means coupling the rear wheel sprocket and the pedal sprocket whereby rotation of the pedal sprocket induces rotation of the rear wheel sprocket, left and right elongated pedal bars pivotally mounted to the frame rearward of the point at which the rear wheel is rotatably supported thereby establishing a point of pivot for each pedal bar, and said pedal bars extended forwardly from the respective point of pivot to a position between the front and rear wheels, left and right foot pedals mounted to the pedal bars spaced forward of the point of pivot and located between the front and rear wheels and adapted to be engaged by the left and right feet of a rider, said pedal bars adapted for limited oppositely directed up and down reciprocal movement as induced by downward pressure applied to each foot pedal by a rider, and second coupling means coupling the pedal bars to the pedal sprocket, said second coupling means including a shaft, a ratchet means comprising a one way sprocket provided for each of said left and right pedal bars connected to the shaft, a transmission chain for each pedal bar anchored at one end to the pedal bar forward of the pedal bar's pivot, said transmission chain extended over the one way sprocket to rotate the sprocket and the shaft as the pedal bar is pivoted downwardly, and a spring, connected to the other end of the transmission chain and further connected to the bicycle frame forward of the point of pivot of the pedal bars which is stretched upon downward movement of the pedal bar and which draws the transmission chain back over the sprocket upon upward movement of the pedal bar.

2. A bicycle as defined in claim 1 including adjustment means interposed between the transmission chain and pedal bars, said adjustment means permitting adjustment of the point of attachment of the chain along the length of the bar to vary the mechanical advantage as between the force to generate pedal movement and the resistive force of the chain.

3. A bicycle as defined in claim 2 including a lock mechanism engaging the adjustment means to selectively lock the position of the chain attachment to the rod.

4. A bicycle as defined in claim 3 wherein a section of the pedal bar includes a guide way, a block slidably contained in the guide way, a shifting cable connected to the block and a shifting lever attached to the cable for extending and retracting the cable and thereby moving the block along the guide way.

5. A bicycle as defined in claim 4 wherein the lock mechanism includes a brake shoe between the chain attachment and pedal bar that is compressed between them by the downward force of the pedal bar to interlock the pedal bar and chain and prevent relative shifting movement thereof.

* * * * *